(12) United States Patent
Suzuki et al.

(10) Patent No.: US 6,455,962 B2
(45) Date of Patent: Sep. 24, 2002

(54) TERMINAL STRUCTURE OF A MOTOR

(75) Inventors: Yuzuru Suzuki, Iwata-gun (JP);
Kunitake Matsushita, Iwata-gun (JP);
Hiroichi Shibata, Iwata-gun (JP);
Naoyuki Harada, Iwata-gun (JP);
Taketoshi Ohyashiki, Iwata-gun (JP);
Sakae Fujitani, Iwata-gun (JP);
Hirohito Nakamata, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/803,909

(22) Filed: Mar. 13, 2001

(30) Foreign Application Priority Data

Mar. 30, 2000 (JP) ........................ 2000-094002

(51) Int. Cl.[7] ..................... H02K 11/00; H02K 5/04
(52) U.S. Cl. ......................... 310/71; 310/194
(58) Field of Search ............... 370/71, 49 R, 370/208, 194, 164; 336/192, 198; 439/884, 874, 875

(56) References Cited

U.S. PATENT DOCUMENTS

| | | | | |
|---|---|---|---|---|
| 4,720,646 A | * | 1/1988 | Torimoto | 310/194 |
| 4,849,588 A | * | 7/1989 | Itoh et al. | 200/38 C |
| 5,001,379 A | * | 3/1991 | Katayama | 310/194 |
| 5,004,941 A | | 4/1991 | Ohzeki et al. | 310/49 R |
| 5,057,732 A | * | 10/1991 | Fukaya | 310/194 |
| 5,264,816 A | * | 11/1993 | Degenhart et al. | 310/71 |
| 5,350,960 A | * | 9/1994 | Kiri et al. | 310/194 |
| 5,389,846 A | * | 2/1995 | Okazaki et al. | 310/40 MM |
| 5,633,542 A | * | 5/1997 | Yuhi et al. | 310/40 MM |
| 5,912,517 A | | 6/1999 | Nishimura et al. | 370/71 |

FOREIGN PATENT DOCUMENTS

| | | |
|---|---|---|
| DE | 195 34 976 A1 | 4/1996 |
| EP | 0 905 860 A2 | 3/1999 |
| JP | 62-105409 A | 5/1987 |
| JP | 5-64411 A | 3/1993 |

* cited by examiner

Primary Examiner—Tran Nguyen
Assistant Examiner—Dang Dinh Le
(74) Attorney, Agent, or Firm—Oliff & Berridge, PLC (57) ABSTRACT

A terminal of a motor is provided, in which a connection between a coil and an external circuit can be carried out securely and with a good workability, while saving material resources and enhancing safety relating to environmental pollution. A terminal (23) consists integrally of a magnet wire binding section (20) to connect to a magnet wire (4) of a coil (6), an external connection section (21) to connect to an external circuit and a support base section (22) to press-fit into a terminal block (19) of a bobbin (5) and hold the terminal (23), and the magnet wire (4) is plasma welded for connection through to the external connection section (21) (terminal 23). The connection of the terminal is carried out by welding (plasma welding), thus the end of the magnet wire of a motor (1) is connected without using solder containing lead. As a result, since lead is not used, material resources can be saved and safety relating to the environmental pollution can be enhanced. Since the support base section (22) press-fits into a hole of the terminal block (19) of the bobbin (5), a direction and position of the terminal (23) are settled to thereby increase the stability.

10 Claims, 5 Drawing Sheets

TERMINAL STRUCTURE OF A MOTOR

BACKGROUND OF THE INVENTION

1. Field of the Invention

The present invention relates to a terminal structure employed in an inner rotor-type motor, and more particularly, to a terminal structure of a motor suitable for connection by welding.

2. Description of the Related Art

In recent years, from demands for environmental pollution-control measures, etc., solder for welding or attaching various kinds of parts is desired to be lead-free. Accordingly, research on lead-free solder (solder containing no lead) has been actively carried out. Use of lead-free solder also for connecting ends of a magnet wire of a motor coil is being considered.

For instance, in case of a PM-type stepping motor, after a an end part of a magnet wire from a coil is bound several turns around a terminal press-fitted into a terminal block (bobbin), the terminal is dipped in a solder bath filled with molten solder to detach an insulation coating from the magnet wire and at the same time to connect a copper lead wire as a core wire and the terminal by means of soldering, wherein the above mentioned lead-free solder is expected to be used.

However, though the lead-free solder is expected to be used in the connection of the end of magnet wire of the PM-type stepping motor, the molten lead-free solder suffers an intense oxidization and becomes brittle (so-called cold solder) unless placed ina reduced atmosphere of nitrogen. Thus, its reliability cannot be ensured and the lead-free solder has not been adopted.

The lead-free solder, from the view point of its characteristics, is subject to various restrictions such as a method of use and its solderability with objects to be soldered, and further, compared with a conventional eutectic-type solder, has a higher melting point, is more liable to cause a problem like a poor contact, requires a higher level of soldering technique, is more difficult to use, and is more expensive as well. So, an alternative to the lead-free solder has been under consideration.

SUMMARY OF THE INVENTION

The present invention has been made in view of the above-mentioned circumstances, and therefore has an object to provide a motor terminal having a structure which enables a coil and an external circuit to be connected securely and with a good workability, while saving material resources and increasing safety relating to environmental pollution.

According to a first aspect of the present invention, there is provided a terminal structure for a motor which comprises a stator in which-a coil formed by winding a magnet wire around a bobbin made of an insulating material is inserted in a stator yoke made of a soft magnetic material and a rotor which includes a permanent magnet rotatably arranged in an inner circumference of the stator, the terminal structure characterized in that the bobbin includes a terminal for connecting the coil and an external circuit and that the terminal consists integrally of a magnet wire binding section to connect to the magnet wire of the coil, an external connection section to connect to the external circuit and a support base section to press-fit into a terminal block (bobbin) and hold the terminal onto the block.

That is, in the first aspect of the present invention, the terminal is structured into three sections by function. The first is the magnet wire binding section that does a function of a terminal to connect to the magnet wire from the coil wound around the bobbin, the second is the external connection section that has a function of a terminal to connect to the external circuit, and the third is the support base section that press-fits into the terminal block and hold the terminal onto the block. While these three sections are adapted to be handled independently of each other, they are structured integrally so as to be handled as a single terminal.

The reason for employing the structure of the terminal composed of three sections is as follows. When connecting an end of magnet wire, that is, connecting, by means of fusing (plasma welding), the magnet wire bound around the magnet wire binding section to the terminal, a discharge current resulting from plasma welding must be allowed to flow, and therefore a ground electrode of a plasma welding machine is connected to the external connection section which is electrically continuous with a welded portion, thereby enabling the welding operation and also enabling the terminal to connect externally without getting melted or deformed by the welding.

Note that the terminal may be so structured that a direction and position of the terminal may be settled by press-fitting a junction of the magnet wire binding section, the external connection section and the support base section, together with the support base section, into a guide hole and a groove provided in the terminal block.

According to a second aspect of the present invention, in the terminal structure according to the first aspect of the present invention, at least one of a projection and a recess, for preventing the terminal from pulling out from the terminal block, is formed at the support base section.

According to a third aspect of the present invention, in the terminal structure according to the first or second aspect of the present invention, the length of the external connection section is greater than the length of the magnet wire binding section.

The reason the length of the external connection section is set greater than that of the magnet wire bending section is, to make the connection of the ground electrode easier when connecting the magnet wire from the coil onto the magnet wire binding section by plasma welding, and make the external connection of the terminal easier. The length of the external connection section may be set equivalent to the length of the magnet wire binding section.

According to a fourth aspect of the present invention, in the terminal structure according to any one of the first to third aspects of the present invention, the connection of the magnet wire binding section and the magnet wire of the coil is carried out by means of fusing.

According to a fifth aspect of the present invention, in the terminal structure according to any one of the first to third aspects of the present invention, the connection of the magnet wire binding section and the magnet wire of the coil is carried out by resistance welding.

According to a sixth aspect of the present invention, in the terminal structure according to any one of the first to fifth aspects of the present invention, the support base section and the external connection section are both formed in a rectangular shape and connected to each other in series longitudinally, the magnet wire binding section is formed in a substantially L-shape with a first wing thereof joining with the junction of the support base section and the external connection section in such a manner that the first wing is perpendicular to the support base section and that a second wing thereof is parallel with the external connection section with a given distance therebetween, and the length of the second wing is set different from that of the external connection section.

According to a seventh aspect of the present invention, in the terminal structure according to the sixth aspect of the present invention, an end portion of magnet wire of the coil is bound around the second wing of the magnet wire binding section and the length of the second wing is set so that the distance from an end of the binding of the magnet wire to a tip end of the second wing falls within a range of 0.5 to 3 mm.

According to an eighth aspect of the present invention, in the terminal structure according to any one of the first to fifth aspects of the present invention, the support base section and the external connection section are both formed in a rectangular shape and connected to each other in series longitudinally, the magnet wire binding section. is formed in a substantially L-shape with a first wing thereof joining with the conjunction of the support base section and the external connection section in such a manner that the first wing is perpendicular to the support base section and that a second wing thereof is parallel with the external connection section with a given distance therebetween, the length of the external connection section is set larger than the length of the second wing, and the junction of the support base section, the external connection section and the first wing of the magnet wire binding section, as well as the support base section, is adapted to press-fit into the terminal block (bobbin).

According to a ninth aspect of the present invention, in the terminal structure according to the eighth aspect of the present invention, the tip end of magnet wire of the coil is bound around the second wing of the magnet wire binding section, and the length of the second wing is set so that the distance from an end of the binding of the magnet wire to a tip end of the second wing falls within a range of 0.5 to 3 mm.

According to a tenth aspect of the present invention, in the terminal structure according to any one of the first to ninth aspects of the present invention, a lead terminal for bridging the external connection section and the external circuit is connected to the external connection section by resistance welding.

According to an eleventh aspect of the present invention, in the terminal structure according to the tenth aspect of the present invention, a groove into which the lead terminal fits is provided at the tip end of the external connection section.

According to a twelfth aspect of the present invention, in the terminal structure according to the tenth aspect of the present invention, the lead terminal is set wider at an end joining with the external connection section, and a groove is provided at the center of the wider portion for fixing the external connection section.

DETAILED DESCRIPTION OF THE PREFERRED EMBODIMENTS

A first embodiment of the present invention will be explained with reference to FIGS. 1 to 7.

Figure 1:
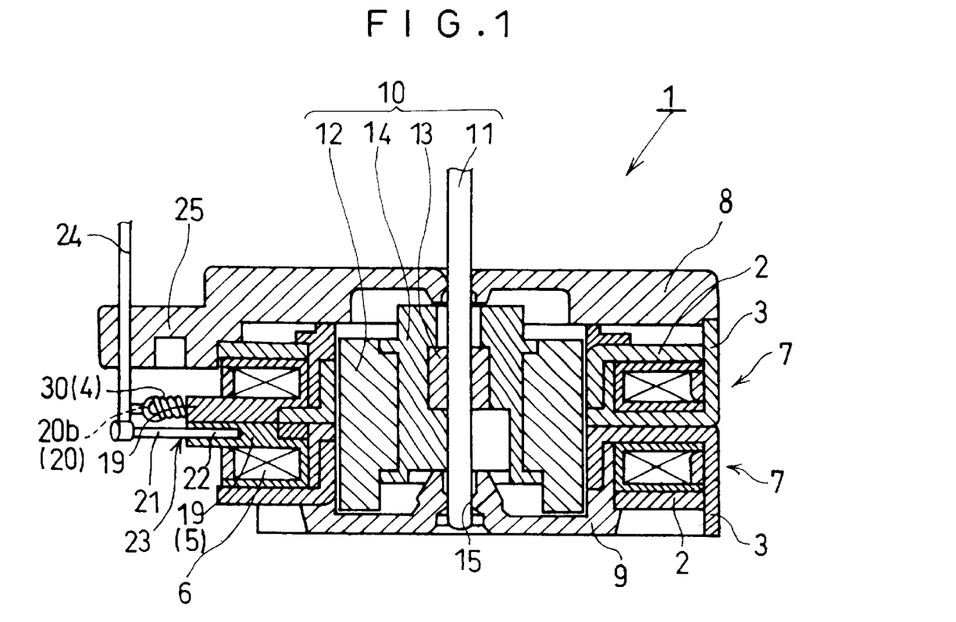
FIG. 1 is a sectional view (taken along a line A—A of FIG. 2) of a motor with a terminal structure according to a first embodiment of the resent invention.
Figure 2:
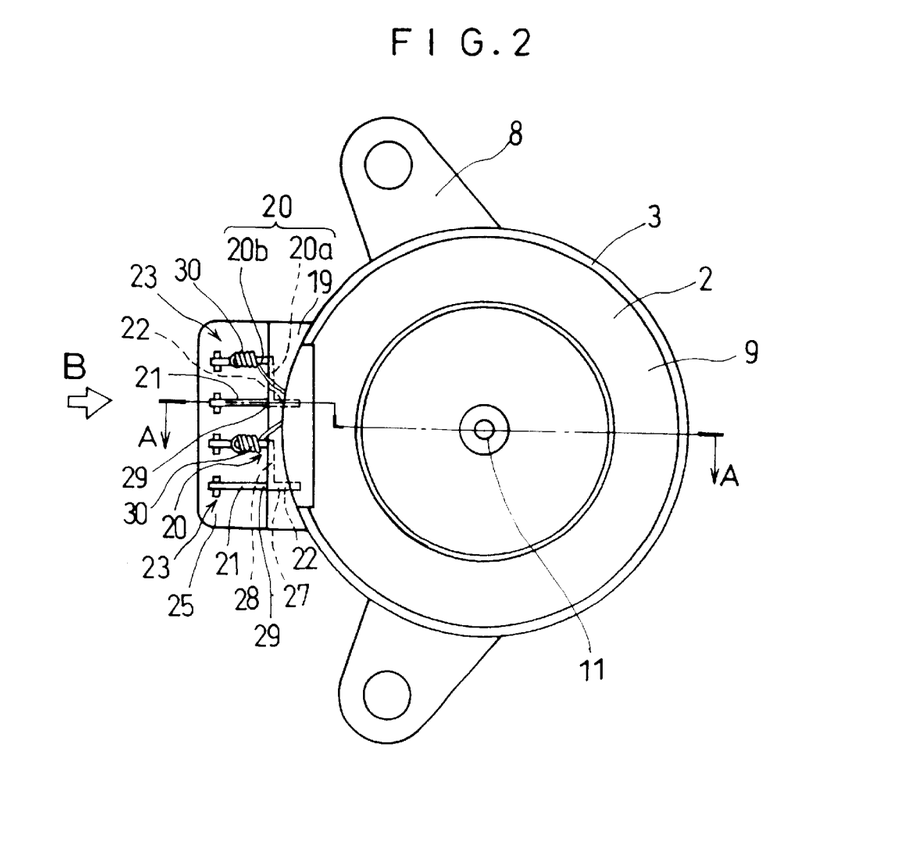
FIG. 2 is a bottom view of the motor of FIG. 1.
Figure 3:
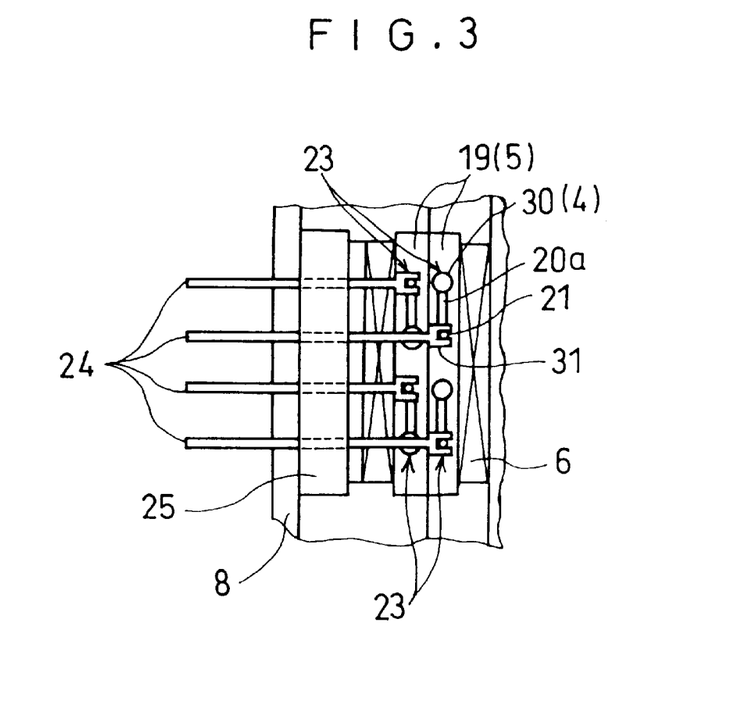
FIG. 3 is a partial view of the motor of FIG. 2 viewed from an arrow B.

In FIGS. 1 to 3, a PM-type stepping motor (inner rotor-type stepping motor) 1 includes stator yokes 2, 3, which are made of steel of a soft magnetic material and pressed to be formed in a donut-shape. On an inner circumference of the stator yokes 2, 3, pole teeth shaped like a comb (not shown) are provided. The stator yokes 2, 3 encase a coil 6, which is formed by winding a magnet wire 4 around a bobbin 5, and constitute a stator assembly 7 in association with the coil 6.

Two stator assemblies 7, 7 are put together with one on another as shown in FIG. 1. There are provided two bobbins 5, 5 to mate the two stator assemblies 7, 7 respectively.

A front plate 8 and a rear plate 9 are fixed onto the stator assemblies 7, 7 in such a manner as to cover a space defined by the inner circumference of the stator yokes 2, 3.

A rotor 10 is provided inside the stator assemblies 7, 7. The rotor 10 includes a shaft 11 as a rotation axis and a permanent magnet 12 having a plurality of magnetic poles on the circumference thereof opposite to the comb-like pole teeth formed on the inner circumference of the stator yokes 2, 3.

The shaft 11 is press-fitted into a sleeve 13. The permanent magnet 12 and the sleeve 13 (meaning also shaft 11) are fixedly held together with a holder 14 made of a high polymer material.

The rear plate 9 is molded with PBT resin, a kind of high polymer, integrally with the two stator assemblies 7, 7 put together back to back. In this process, a hole 15 for bearing as an axis of rotation and a diameter of the inner circumference of the stator assemblies 7, 7, where the comb-like pole teeth are provided, are simultaneously formed with a same mandrel. Accordingly, its highly-precise coaxiality can be ensured.

Figure 4:
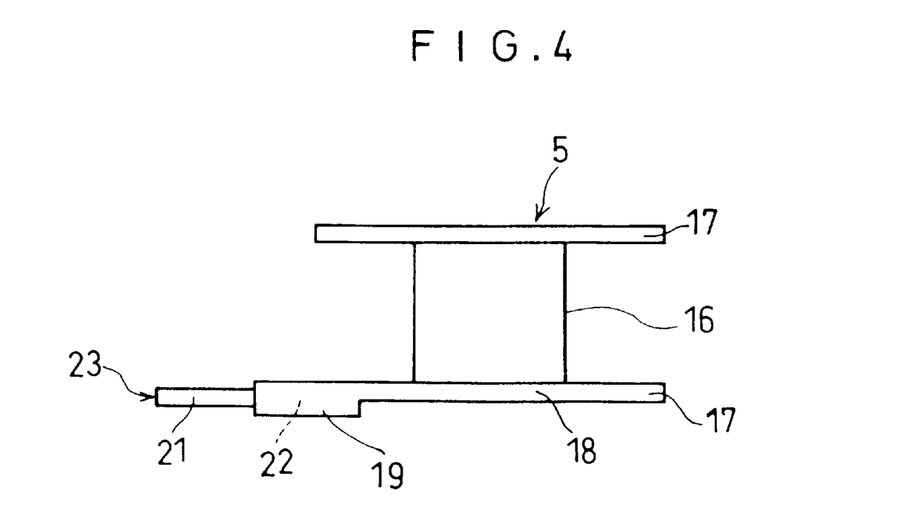
FIG. 4 is a plan view of a bobbin of FIG. 1.
Figure 5:
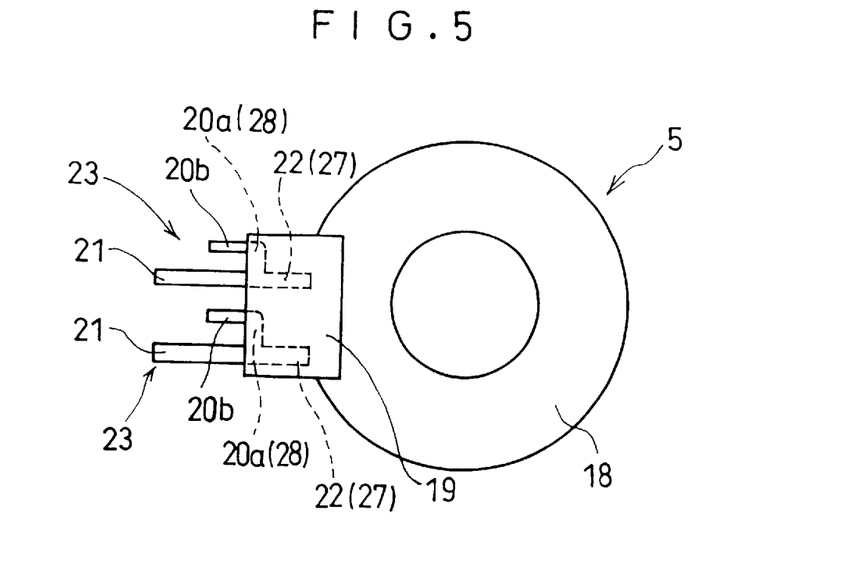
FIG. 5 is a bottom view of the bobbin of FIG. 4.

The bobbin 5 is made of a high polymer material such as the PBT resin. The bobbin 5 generally comprises, as shown in FIGS. 4 and 5, a cylinder 16 and approximately annular flanges 17, 17 provided at both ends of the cylinder 16 and projecting radially outward. One flange 17 (lower side in FIG. 4) of the two flanges 17, 17 includes an approximately annular-flange proper 18 and a terminal block 19 formed on a portion (near a terminal 23 to be described later) of the flange proper 18 and substantially rectangular in a plan view (See FIG. 5).

The terminal block 19 projects outward in a radial direction from the flange proper 18 and is set larger in thickness than the flange proper 18. As described above, two bobbins 5 are provided, and hence two terminal blocks 19 are provided. The two terminal blocks 19 are put together, as shown in FIGS. 1 and 3.

Two terminals 23 made of phosphorous bronze and consisting integrally of a magnet wire binding section 20, an external connection section 21 and a support base section 22 are press-fitted into the terminal block 19 of the bobbin 5. The motor 1 is adapted to include 4 terminals 23, as shown in FIG. 3, as the motor has two bobbins 5 each including two terminals 23.

A lead terminal 24 connecting to an external circuit is connected to each of the four terminals 23. Four lead terminals 24 go through a lead terminal holder 25 which projects from the front plate 8. The rearward projection lengths of the four lead terminals 24 from the lead terminal holder 25 are determined to the positions of the terminals 23 to be connected to.

The magnet wire binding section 20 of the terminal 23, around which the magnet wire 4 of the coil 6 is bound several turns, is plasma welded for connection with the magnet wire 4 and for holding the same, to thereby improve the reliability of winding and the workability of handling.

The external connection section 21 fits into a groove 26 (See FIG. 7) provided on a tip end of the lead terminal 24 to connect externally with a tip end thereof projecting from the lead terminal 24, is crimped with the lead terminal 24 and plasma-welded for connection.

The support base section 22 is adapted to fit into a hole 27 and a groove 28 continuous therewith which are formed in the terminal block 19 of the bobbin 5, thereby supporting the terminal 23 onto the terminal block of the bobbin 5 precisely.

The support base section 22 and the external connection section 21 are both formed in a rectangle shape, and join with each other in series (the portion is referred to as junction 29 "joining portion"). The magnet wire binding section 20 is formed in an approximately L shape. One wing (first wing 20a) of the magnet wire binding section 20 joins with the junction 29 in such a manner that the first wing 20a is perpendicular to the support base section 22 and that other wing (second wing 20b) of the magnet wire binding section 20 is parallel with the external connection section 21 with a given distance therebetween.

Figure 6:
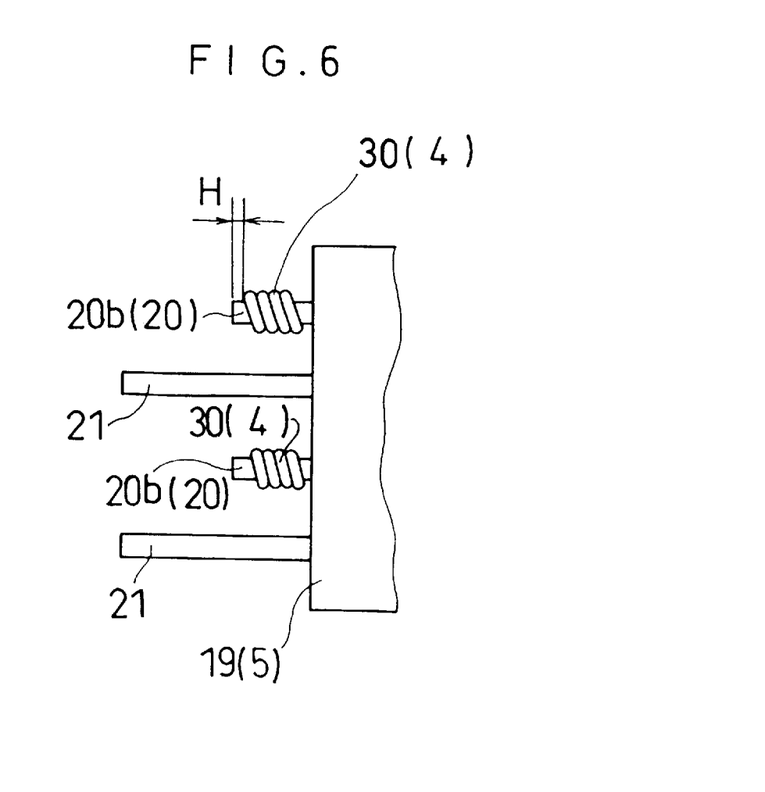
FIG. 6 is a schematic view of a state haw an end of a magnet wire of a coil is bound around a magnet wire binding section of FIG. 1.

The length of the external connection section 21 is set larger than that of the second wing 20b of the magnet wire binding section 20 as shown in FIGS. 5 and 6.

The magnet wire 4 of the coil 6 (end of the coil 6) is bound (referred to as binding 30) several turns around the second wing 20b of the magnet wire binding section 20 upon winding. The length of the magnet wire of the coil 6 is set so that the distance H from the end of the binding 30 of the magnet wire 4 to the tip end of the second wing 20b falls within a range of 0.5 to 3 mm.

This is required to enable connection by means of fusing (connection by plasma welding). The fusing connection is carried out as follows. First, the second wing 20b of the magnet wire binding section 20 is melted, and an insulating coating on the magnet wire 4 of the coil 6 is thermally peeled off with this molten metal, whereby a copper wire as a core wire is connected to the second wing 20b. If the distance between the tip end of the second wing 20b and the end of the binding 30 is too short or zero, the magnet wire 4 of the coil 6 is sublimed due to the energy of plasma (arc), and the connection is prohibited. In order to avoid this problem (failure of connection), the above-mentioned distance H is set 0.5 mm or longer.

Further, if the distance H is set longer than 3 mm, the molten metal does not reach the magnet wire 4 of the coil 6, and thus the connection does not happen. To avoid this problem, the distance H is set 3 mm maximum.

Figure 7:
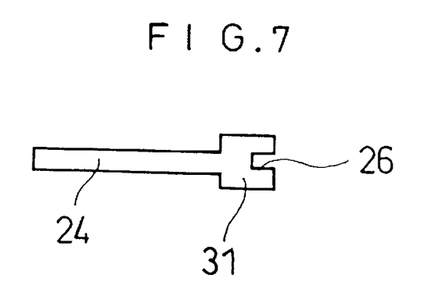
FIG. 7 is a front view of a lead terminal.

A widened portion 31 is formed at the end of the lead terminal 24, as shown in FIG. 7, and at the center of the widened portion 31 the groove 26 is provided for receiving the external connection section 21. The external connection section 21 fits into the groove 26 with its tip end projecting, is crimped with the terminal 23 and connected to the lead terminal 24 by plasma welding. In this embodiment, the lead terminal 24 is grounded at the time of welding.

The magnet wire 4 of the coil 6 is connected to the external circuit through the terminal 23 press-fitted into the terminal block 19 and the lead terminal 24.

In this PM-type stepping motor 1, the two stator assemblies 7, 7 are joined to each other back to back, and the stator formed by this joining is molded integrally with the rear plate 9 using a PBT resin (a polymer material). At this point, the hole 15 for bearing as a rotation axis and the comb-like pole teeth provided on the inner circumference of the stator assemblies 7, 7 are formed simultaneously using a unitary type of mandrel. As a result, this PM-type stepping motor 1 guarantees a highly-precise coaxiality.

In the PM stepping motor 1 constituted as mentioned above, the terminal 23 consists integrally of the magnet wire binding section 20 to connect to the magnet wire 4 of the coil 6, the external connection section 21 to connect to the external circuit, and the support base section 22 to press-fit into the terminal block 19, wherein the magnet wire 4 is plasma welded for connection through to the external connection section 21 (terminal 23), thereby carrying out the connection of the terminal of the motor 1 by means of welding (plasma welding). Thus, since the terminal is connected without using solder containing lead, safety in regards to pollution is improved to that extent.

Since the external connection section 21 fits into the groove 26 of the lead terminal 24, the lead terminal 24 and the external connection section 21 (terminal 23) are brought into secure and stable contact. As a result, plasma welding is carried out stably. Further, since the external connection section 21 fits into the groove 26 of the lead terminal 24 whereby the external connection section 21 and the lead terminal 24 contact with each other securely and stably, an electrical continuity is ensured. In this case, after the end of the external connection section 21 fits into the groove 26 of the lead terminal 24, the tip end is crimped with the lead terminal 24. Thus the contact between the external connection section 21 and the lead terminal 24 is further secured, resulting in an improvement in its electrical continuity.

In connecting the terminal of a motor using lead-free solder, there has been a concern that a high technique required for soldering will lower the workability and increase the cost of equipment. In the present embodiment, the terminal of the motor 1 is connected by welding (plasma welding), and therefore the reduction in the workability of connecting the terminal of the motor 1 and the cost increase for the apparatus due to lead-free soldering can be avoided.

Further, in this embodiment, since the terminal of the motor 1 is connected by plasma welding, the insulation coating of the magnet wire 4 can be peeled off effectively.

Further, since the terminal 23 consists integrally of the magnet wire binding section 20, the external connection section 21 and the support base section 22 and since the support base section 22 press-fits into the hole 27 of the terminal block 19 (outer surface of the bobbin 5), the direction and position of the terminal 23 are settled securely, to thereby increase the stability. For reference, in this embodiment, the support base section 22 fits into the hole 27 and at the same time the first wing 20a of the magnet wire binding section 20, as well as the junction 29, fits into the groove 28 thereby press-fitting the terminal 23 into the terminal block 19, so the direction and position of the terminal 23 can be settled further securely and stably.

Further, since the distance H from the end of the binding 30 to the tip end of the second wing 20b of the magnet wire binding section 20 is set to fall within a range of 0.5 to 3 mm, it can be prevented from happening that the magnet wire 4 of the coil 6 is sublimed due to the energy of plasma (arc) and that the molten metal does not reach the magnet wire 4, leading to a failure in connection. Thus, good welding is ensured.

The length of the external connection section 21 is set larger than that of the second wing 20b of the magnet wire binding section 20. Therefore, the external connection section 21 can be connected to the lead terminal 24 easier, and the interference thereof can be reduced to a minimum allowing the external connection section 21 to be bent at a right angle, for instance. To that extent, usage is expanded for flexible application. When the external connection section 21 is bent as mentioned above, it may arise that the terminal 23 is too long, resulting in deterioration in the workability. In such a case, the terminal 23 is connected to the lead terminal 24 while holding the terminal 23, for instance, on a flange provided separately for stabilization, whereby the deterioration of the workability can be prevented.

Figure 8:
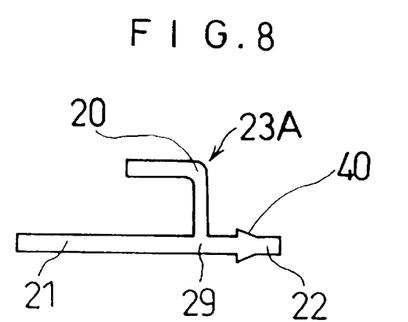
FIG. 8 is a plan view of a second embodiment of the present invention.
Figure 9:
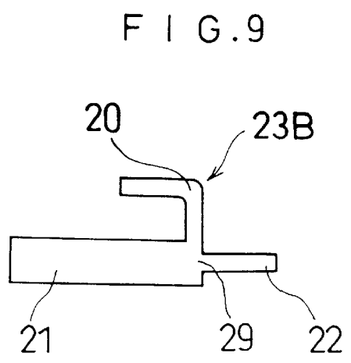
FIG. 9 is a plan view of a third embodiment of the present invention.
Figure 10:
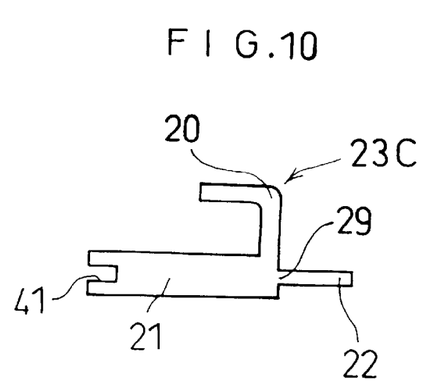
FIG. 10 is a plan view of a fourth embodiment of the present invention.

The terminal 23 is not limited to the above embodiment, but a terminal 23A (second embodiment) shown in FIG. 8, a terminal 23B (third embodiment) shown in FIG. 9 and a terminal 23C (fourth embodiment) shown in FIG. 10 may be used.

In a second embodiment, as shown in FIG. 8, the support base section 22 of the terminal 23A is provided with a wedge-like projection 40 that prevents the terminal 23A from pulling out from the terminal block 19, and the hole 27 in the terminal block 19 (outer surface of the bobbin 5) is provided with an engaging portion (not shown) to catch the projection 40.

According to the second embodiment, the pulling-out strength of the terminal 23A is increased due to the projection 40 being caught by the engaging portion (not shown). As a result, even when the length of the support base section 22 is short, the terminal 23A is held securely.

Note that a recess (not shown) instead of the projection 40 may be formed at the support base section 22, and a projection as an engaging portion for the engagement with the recess may be provided on the wall of the hole 27 in the terminal block 19. Further, both a projection and a recess (not shown) are formed on the support base section 22 ,and an engaging portion to engage with the projection and the recess may be provided on the wall of the hole 27 in the terminal block 19.

In the terminal 23B of a third embodiment, as shown in FIG. 9, the width (area) of the external connection section 21 is set larger than the width (area) of the support base section 22.

According to the third embodiment, the area of the external connection section 21 contacting with the lead terminal 24 is increased, whereby the lead terminal 24 and the external connection section 21 can be welded securely and stably.

In a fourth embodiment, as shown in FIG. 10, a cutout 41 (groove) is formed at the tip end of the external connection section 21 and the tip end of the lead terminal 24 fits into the cutout 41 and crimped to make the contact therebetween secure and stable, resulting in a stable welding. Note that, the groove 26, which is formed at the tip end of the lead terminal 24 in the first embodiment as shown in FIG. 7, is not formed when the cutout 41 is formed at the tip end of the external connection section 21 as in the case of the fourth embodiment.

In each of the above embodiments the connection between the lead terminal 24 and the external connection section 21 is carried out by plasma welding, but resistance welding may be used. Note that in the case of using the resistance welding, a face of the external connection section 21 and a face of the lead terminal 24 are adapted to partly overlap each other, so the external connection section 21 and the lead terminal 24 are set a little longer for the area of overlapping. With such a setting, a stable welding is enabled. Further, when using the resistance welding, the terminal 23 is preferably formed of a ferrous material.

Figure 11:
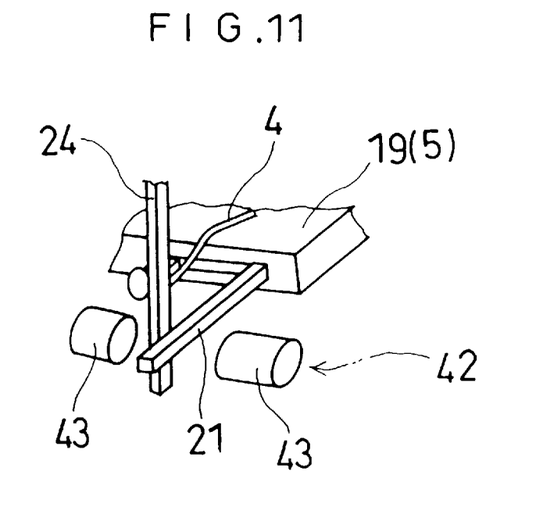
FIG. 11 is a perspective view of a fifth embodiment of the present invention.

In FIG. 11, an example of the resistance welding (fifth embodiment) is shown.

In a fifth embodiment, the external connection section 21 and the lead terminal 24 are positioned so as to partly overlap each other, and the overlap portion is clamped and pressed with electrodes 43, 43 of a resistance welding machine 42, then a current is applied to complete the welding. Thus, the external connection section 21 and the lead terminal 24 are connected.

Such a resistance welding as illustrated in the fifth embodiment can be performed when the external connection section 21 and the lead terminal 24 are positioned so as to overlap as shown in FIG. 11. However, in the case where the external connection section 21 and the lead terminal 24 can not be positioned so as to overlap each other due to a space constraint, a resistance welding (sixth embodiment) shown in FIG. 12 can be employed to connect the external connection section 21 and the lead terminal 24.

In a sixth embodiment, the lead terminal 24 is positioned with an end face thereof in contact with a face (upper face in FIG. 12) of the external connection section 21 and welded. In this case, when the area of the face of the external connection section 21 is large, there is an easier contact with the end face of the lead terminal 24. Accordingly, the workability is improved. Further, by increasing the area of the face of the external connection section 21, the connection can be carried out stably even if the contact position to the lead terminal 24 varies some or less.

Figure 12:
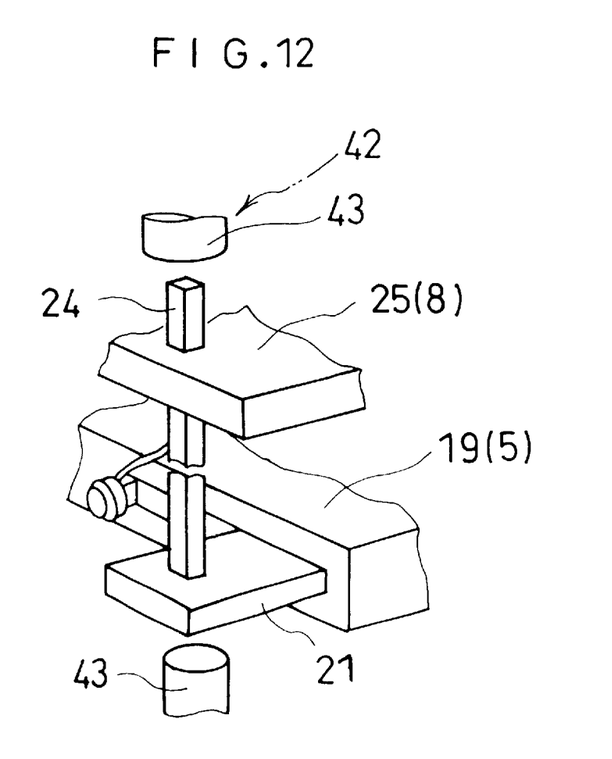
FIG. 12 is a perspective view of a sixth embodiment of the present invention.

Further, according to this sixth embodiment, even if it cannot happen due to a space constraint that the external connection section 21 and the lead terminal 24 are positioned to overlap each other (for example, as shown in FIG. 11), the connection between the external connection section 21 and the lead terminal 24 can be successfully achieved.

Note that, in each of the above embodiments the material of the terminal 23 is a phosphorous bronze, but the present invention is not limited to this material, but other materials such as a copper alloy may be used.

According to the first aspect of the present invention, a terminal consists integrally of a magnet wire binding section to connect to a magnet wire of a coil, an external connection section, and a support base section to press-fit into a terminal block. As the support base section press-fits into the terminal block, the direction and position of the terminal are settled with the result that the stability is increased.

Further, since the terminal is divided into the three sections, a ground electrode of a plasma welding machine is connected to the external connection section, which is electrically continuous with the welding portion, whereby discharge current caused by plasma welding is allowed to flow. So, a magnet wire bound around the magnet wire binding section can be connected by means of fusing (plasma welding), with the result that the connection of the motor terminal can be carried out without using solder containing lead thereby saving material resources. At the same time, since lead is not used, the safety relating to the environmental pollution can be enhanced.

According to the second aspect of the present invention, since a projection and/or a recess for preventing the terminal from pulling out are provided on the support base section, the force of engaging with the terminal block is increased. As a result, the terminal can be held more stably to the terminal block.

According to the third aspect of the present invention, the length of the external connection section is set larger than that of the magnet wire binding section. As a result, the connection of the ground electrode can be made easier when the magnet wire of the coil is plasma welded for connection to the magnet wire binding section, and at the same time the terminal can be externally connected easily.

According to the fourth aspect of the present invention, the magnet wire binding section and the magnet wire of the coil are connected by means of fusing (plasma welding), with the result that the connection of the motor terminal is carried out without using solder containing lead. As a result, material resources can be saved and the safety relating to the environmental pollution can be enhanced.

According to the fifth aspect of the present invention, the magnet wire binding section and the magnet wire of the coil are connected by resistance welding, with the result that the connection of the motor terminal is carried out without using solder containing lead. As a result, material resources can be saved and the safety relating to the environmental pollution can be enhanced.

According to the sixth aspect of the present invention, the external connection section may be set longer than a second wing of the magnet wire binding section. As a result, the lead terminal and the external connection section can partly overlap and also the resistance welding thereof is made easier.

According to the seventh or ninth aspect of the present invention, the distance from the end of the binding of the magnet wire of the coil to the tip end of the second wing of the magnet wire binding section is set 0.5 mm or longer. As a result, the magnet wire of the coil can be prevented from subliming due to the energy of plasma (arc), enabling the magnet wire of the coil to be connected to the magnet wire binding section by plasma welding. In addition, since the distance is set 3 mm maximum, it does not happen that molten metal fails to reach the magnet-wire, ensuring that the magnet wire of the coil is connected to the magnet wire binding section by plasma welding.

According to the eighth aspect of the present invention, a junction ofthe support base section, the external connection section and a first wing of the magnet wire binding section, as well as the support base section, press-fits into the terminal block. As a result, the terminal is positioned duly and at the same time held securely, improving the workability.

According to the tenth aspect of the present invention, the connection of the lead terminal and the external connection section is carried out by resistance welding. Therefore, material sources can be saved and welding can be done with a relatively general purpose equipment, resulting in reducing the cost of welding work and the cost of appliance.

According to the eleventh aspect of the present invention, the lead terminal press-fits into a groove provided at the tip end of the external connection section. As a result, the welding between the lead terminal and the external connection section can be carried out securely and stably, and at the same time the welding work can be done easily.

According to the twelfth aspect of the present invention, the external connection section can be guided to a groove at the widened portion of the lead terminal. As a result, the welding between the lead terminal and the external connection section can be carried out securely and stably.

What is claimed is:

1. A terminal structure of a motor,
    said motor comprising: a stator in which a coil, which is formed by winding a magnet wire around a bobbin made of an insulating material, is inserted in a stator yoke made of a soft magnetic material; and a rotor which includes a permanent magnet, which is rotatably arranged in an inner circumference of said stator, said terminal structure characterized in that:
    said bobbin includes a terminal for connecting said coil and an external circuit;
    said terminal consists integrally of: a magnet wire binding section to connect to the magnet wire of said coil; an external connection section to connect to said external circuit; and a support base section to press-fit into a terminal block of said bobbin and hold said terminal;
    said magnet wire binding section is formed in a substantially L-shape with a first wing thereof joining with a junction of said support base section and said external connection section in such a manner that said first wing thereof is perpendicular to said support base section and that a second wing thereof is parallel with said external connection section with a prescribed distance therebetween; and
    a length of said second wing of said magnet wire binding section is set different from a length of said external connection section.

2. The terminal structure of claim 1, wherein a junction of said support base section, said external connection section and said first wing of said magnet wire binding section, as well as said support base section, press-fits into said terminal block of said bobbin.

3. The terminal structure of claim 1, wherein an end of the magnet wire of said coil is bound around said second wing of said magnet wire binding section; and a length of said second wing of said magnet wire binding section is set so that a distance from an end of the binding of the magnet wire to a tip end of said second wing of said magnet wire binding section falls within a range of 0.5 to 3 mm.

4. The terminal structure of claim 1, wherein at least one of a projection and a recess for preventing said terminal from pulling out from said terminal block of said bobbin is formed at said support base section.

5. The terminal structure of claim 1, wherein a length of said external connection section is larger than a length of said magnet wire binding section.

6. The terminal structure of claim 1, wherein the connection of said magnet wire binding section and the magnet wire of said coil is carried out by means of plasma welding.

7. The terminal structure of claim 1, wherein the connection of said magnet wire binding section and the magnet wire of said coil is carried out by means of resistance welding.

8. A terminal structure of claim 1, wherein a lead terminal to connect said external connection section and said external circuit is connected to said external connection section by means of resistance welding.

9. The terminal structure of claim 1, wherein a substantially C-shaped cutout into which said lead terminal fits is provided at a tip end of said external connection section.

10. The terminal structure of claim 1, wherein said lead terminal widens at an end joining with said external connection section, and a substantially C-shaped cutout into which said external connection section fits is provided at the center of the end.

\* \* \* \* \*